United States Patent
Mathal et al.

(10) Patent No.: US 8,503,848 B2
(45) Date of Patent: Aug. 6, 2013

(54) WAVEGUIDE ARRAYS

(75) Inventors: Sagi Varghese Mathal, Palo Alto, CA (US); Paul Kessler Rosenberg, Sunnyvale, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 13/015,546

(22) Filed: Jan. 27, 2011

(65) Prior Publication Data

US 2012/0195564 A1    Aug. 2, 2012

(51) Int. Cl.
*G02B 6/10* (2006.01)

(52) U.S. Cl.
USPC .......................................... 385/129; 385/132

(58) Field of Classification Search
USPC .................................... 385/129, 132
See application file for complete search history.

(56) References Cited

U.S. PATENT DOCUMENTS

| | | | | |
|---|---|---|---|---|
| 4,498,260 A * | 2/1985 | Doty | ............................ | 451/365 |
| 4,828,358 A * | 5/1989 | Blonder | ........................ | 385/18 |
| 4,865,407 A * | 9/1989 | Suzuki et al. | .................... | 385/31 |
| 5,059,763 A * | 10/1991 | O'Brien et al. | .......... | 219/121.69 |
| 5,280,552 A * | 1/1994 | Yokoi et al. | ...................... | 385/78 |
| 5,325,455 A * | 6/1994 | Henson et al. | .................. | 385/89 |
| 5,436,995 A * | 7/1995 | Yoshizawa et al. | ............. | 385/86 |
| 5,537,501 A * | 7/1996 | Iwano et al. | .................... | 385/58 |
| 5,673,346 A * | 9/1997 | Iwano et al. | .................... | 385/60 |
| 6,349,918 B1 * | 2/2002 | Bunker | ......................... | 248/635 |
| 6,510,258 B1 | 1/2003 | Roberts et al. | | |
| 6,583,902 B1 * | 6/2003 | Yuen | .............................. | 398/135 |
| 6,858,436 B2 * | 2/2005 | Zenhausern et al. | .......... | 436/164 |
| 7,342,663 B2 * | 3/2008 | Matsushita et al. | ........... | 356/445 |
| 7,616,846 B2 * | 11/2009 | Hikita et al. | .................... | 385/14 |
| 7,772,555 B2 * | 8/2010 | Hollingsworth | ........... | 250/338.1 |
| 7,957,622 B2 * | 6/2011 | Shimizu et al. | ............... | 385/132 |
| 2002/0021860 A1 * | 2/2002 | Ruan et al. | ...................... | 385/18 |
| 2002/0151092 A1 * | 10/2002 | Li et al. | ........................... | 438/16 |
| 2003/0142917 A1 * | 7/2003 | Merrick | ......................... | 385/53 |
| 2003/0152331 A1 * | 8/2003 | Dair et al. | ....................... | 385/59 |
| 2003/0161586 A1 * | 8/2003 | Hirabayashi | .................... | 385/78 |
| 2003/0215191 A1 * | 11/2003 | Taira et al. | ...................... | 385/78 |
| 2004/0037517 A1 * | 2/2004 | Dair et al. | ....................... | 385/92 |
| 2004/0074661 A1 * | 4/2004 | Schiaffino et al. | ........... | 174/52.5 |
| 2007/0211254 A1 * | 9/2007 | Matsushita et al. | ........... | 356/445 |
| 2008/0185521 A1 * | 8/2008 | Hollingsworth | ........... | 250/338.1 |
| 2009/0190880 A1 * | 7/2009 | Hikita et al. | .................... | 385/14 |

FOREIGN PATENT DOCUMENTS

| | | |
|---|---|---|
| EP | 0532229 | 3/1993 |
| JP | 2001091778 | 4/2001 |
| JP | 2004294660 | 10/2004 |
| JP | 2006133337 | 5/2006 |
| WO | WO03001174 | 1/2003 |

* cited by examiner

*Primary Examiner* — Kaveh Kianni

(57) ABSTRACT

A waveguide array can comprise a base portion having a metalized inner surface, an outer surface, and a clean end surface. The inner surface can include a plurality of waveguide channels that are metalized. The clean end surface can be prepared by breaking the base portion along a groove positioned on the outer surface prior to breaking, where the groove is oriented to intersect the waveguide channels. A metalized cover portion is attached to the inner surface of the base portion to close the waveguide channels.

15 Claims, 3 Drawing Sheets

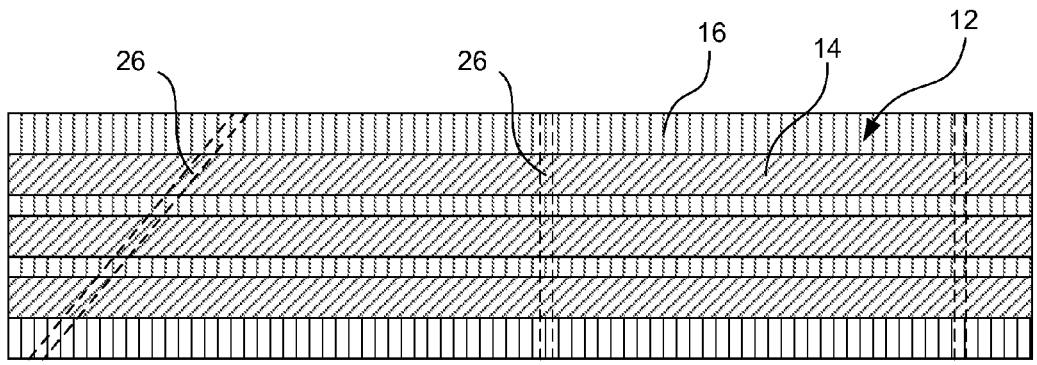

FIG. 5

| Forming a base portion having an inner surface and an outer surface, the inner surface including a plurality of open channels, the outer surface including a groove oriented to intersect the open channels, but which is not deep enough to disrupt the open channels | — 50 |

| Breaking the base portion along the groove to form a clean end surface on the base portion | — 52 |

| Attaching a cover portion to the inner surface of the base portion to form an array of closed channels, wherein the array of closed channels are metalized | — 54 |

FIG. 6

WAVEGUIDE ARRAYS

BACKGROUND

As computer chip speeds on circuit boards increase to ever faster speeds, a communications bottleneck in inter-chip communication is becoming an increasing concern. One solution may be to use fiber optics or other waveguides to interconnect high speed computer chips. However, most circuit boards involve many layers and often involve small tolerances in their manufacture. Physically placing fiber optics connecting the fibers to the chips can be too inaccurate and time consuming to be widely adopted in circuit board manufacturing processes.

One partial solution is to use small, relatively finely detailed plastic parts for optically interconnecting various computer components, but their manufacture in accordance with appropriate tolerances can be challenging. In preparing small plastic parts in general, part of the manufacturing problem relates to the inherent effects of molding and other preparative processes, where plastic edges are not inherently crisp as plastic end faces often undergo shrinkage or other deformation. Removal of molded edges, however, creates other issues. For example, in attempting to use conventional machining, such as saw cutting or milling to create a clean edge on a small and finely detailed plastic part, burrs and/or undesirable breakages form at the edge of the plastic materials, exacerbating the problem. This can be particularly problematic in the area of optics.

BRIEF DESCRIPTION OF THE DRAWINGS

FIG. 5 is a top view depicting the open channels along the "inner surface" as they relate to the grooves (shown in phantom lines), which are present on the "outer surface," in accordance with examples of the present disclosure; and FIG. 6 sets forth steps of forming a waveguide array in accordance with examples of the present disclosure.

DETAILED DESCRIPTION

Figure 1:
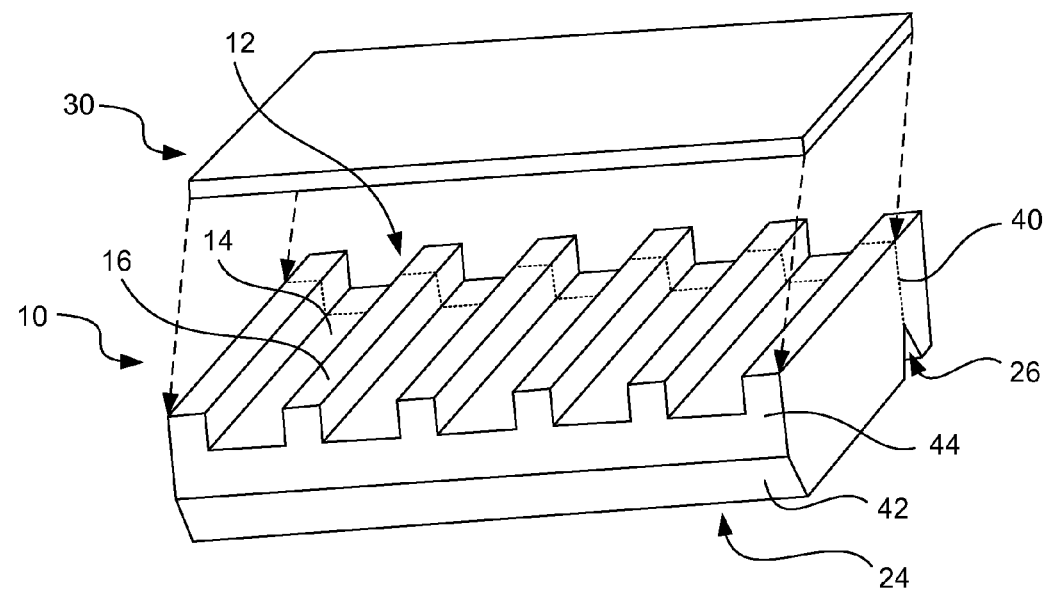
FIG. 1 is a perspective schematic view of preparative steps for making a waveguide array in accordance with examples of the present disclosure.

Reference will now be made to the examples described and illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted that when discussing the waveguide array or the method of making the same, each of these discussions can be considered applicable to each of these examples, whether or not they are explicitly discussed in the context of that example. Thus, for example, in discussing details about the waveguide array per se, or the method, such discussion also refers to the other example, and vice versa.

With this in mind, it is understood that light beams or optical signals are frequently used to transmit digital data. For example, optical signals can be used to transmit data over large distances, between optoelectronic components on nearby circuit boards, between optoelectronic components on a single circuit board, or between circuit boards. For large scale interconnections between multiple optoelectronic components, an optical waveguide array can be used which can have a number of characteristics, including the ability to connect any or all of the inputs to any or all of the outputs with a minimal number of components. An optical waveguide array can also have a high coupling efficiency, modularity, high reliability, and low cost. Furthermore, optical waveguide arrays can be efficiently and inexpensively used for various other purposes, such as for point-to-point interconnects or broadcast bus applications in blade servers, computer servers, etc.

In accordance with this, the present disclosure is drawn to the preparation of waveguide arrays having clean end surfaces, which is useful for interconnection between other waveguides, electrical devices, or optical devices, as well as for providing a reduction in energy loss that can occur with end surfaces that are not as crisp or pristine as those prepared in accordance with examples of the present disclosure. Thus, a technique to singulate waveguide arrays without damaging the end surfaces during formation thereof, along with the possibility of preparing variable lengths of waveguide can be achieved in accordance with examples of the present disclosure.

More specifically, the present disclosure is drawn to a waveguide array and associated methods of making the waveguide array. The waveguide array can comprise a base portion having a metalized inner surface, an outer surface, and a clean end surface. The inner surface includes a plurality of waveguide channels that are metalized. The outer surface is typically flat, though this is not required. The clean end surface is prepared by breaking the base portion along a groove positioned on the outer surface. The groove in this example is oriented to intersect the waveguide channels. To complete the waveguide array, a metalized cover portion is attached to the inner surface of the base portion to close the waveguide channels. In one particular example, the waveguide array can include two clean end surfaces at opposing ends of the waveguide array. Further, in another example, the metalized cover portion can comprise a plastic substrate with a metalized surface, and the metalized surface is attached to the metalized inner surface of the base portion to close the waveguide channels. The clean end surface, formed from breaking the base portion along the groove, provide clean end surfaces that are perpendicular to the waveguide channels, or that are not necessarily perpendicular, but still intersect the waveguide channels.

Turning now specifically to the FIGS., examples of the present disclosure are shown, which are not necessarily to scale. In FIG. 1, a schematic perspective view of an exemplary base portion 10 and cover portion 30 are shown in various states of preparation. Particularly, the base portion includes an inner surface 12 and an outer surface 24. The inner surface includes open channels 14 and ridges 16, and the outer surface includes a groove 26, which is included in the base portion for the purpose of providing a breaking point to form a clean end surface 44. It is noted that the inner surface is referred to as "inner" because once closed by the cover portion, this surface becomes an inner portion of the waveguide array part as a whole. The outer surface is referred to as "outer" because once the cover portion is applied, this surface remains on an outer surface of the finished waveguide array part.

The clean end surface shown in FIG. 1 is formed from a previously spent groove 42. More specifically, the clean end surface was previously broken using that previously used groove as a point to focus the break at the desired location. The break, as a result, provides pristine end, e.g., the clean end surface 44, that is free of artifacts and other undesired breakages as a result of this process. For illustrative purposes, groove 26 is shown prior to breaking. Phantom line 40 is also shown which represents the location of a break that will occur when appropriate breaking pressure is applied to the base portion along the phantom line. Once broken, a new clean end surface (not shown) will be formed. It is noted that in the preparative example shown in FIG. 1, the base portion and the cover portion 30 are not yet metalized. However, it is noted that metallization can occur prior to breaking the part, or after breaking the part, as will be shown hereinafter.

Stated more generally, the present disclosure is drawn toward generating a partially cut groove or otherwise providing a partially penetrating groove 26 through the outer surface 24 of the base portion 10, followed by mechanically breaking the part at the partial cut or groove location. One reason for this approach is due to the fact that conventional machining leads to burrs, particles, or unacceptable damage to the channel and sidewalls of the waveguides. This technique creates pristine waveguide end surfaces 44 which substantially prevent aperturing or scattering of light beams entering and exiting the hollow waveguides of the array and minimizing optical energy propagation loss through the hollow waveguides. Because of this, by preparing more pristine end surfaces initially, elimination of the added step of "deburring" the waveguide channels after singulation by conventional machining is accomplished. Furthermore, though post-processing to "debur" the waveguide array is possible, it is not desirable; and furthermore, is not possible to repair broken sidewalls, which is another problem associated with machine cutting small plastic waveguide arrays using conventional machine cutting techniques.

The formation of the base portion 10 can be by any of a number of methods, including by molding, injection molding, extruding, embossing, roll-to-roll embossing, wet etching, or dry etching. The groove 26, on the other hand, can be prepared as part of the molding, embossing, or etching process in some examples. Alternatively, the groove can be prepared after the base portion is molded, extruded, embossed, or etched using a saw, hotwire, blade, end mill, diamond tip, or the like.

Typically, the groove 26 is prepared so that it is deep enough to generate a crisp, pristine break along base portion 10 (intersecting the channels), but not so deep that the groove enters the open channels 14 of the base portion, thereby causing damage to the channels. In some examples, a groove from 10% to 90% deep measured from the outer surface to the channels works well, though grooves outside of this range can also be effective (provided the open channels are not disrupted). In another example, the groove can be from 25% to 90% deep, and in still another example, the groove can be from 25% to 75% deep. The grooves are positioned along the outer surface 24 to intersect the channels, but they need not be perpendicular to the orientation of the channels. In one example, however, the groove or grooves are perpendicular to the channels. In another example, the groove or grooves are oriented to intersect the channels, but are not perpendicular to the channels. Furthermore, it is noted that there is often more than one groove on a base portion, such as for forming two pristine, clean breaks. Two breaks can be used to form a part with two clean end surfaces at opposing ends of the waveguide array. Furthermore, multiple parts can be prepared from a single base portion where multiple grooves are present to form multiple parts.

Figure 2:
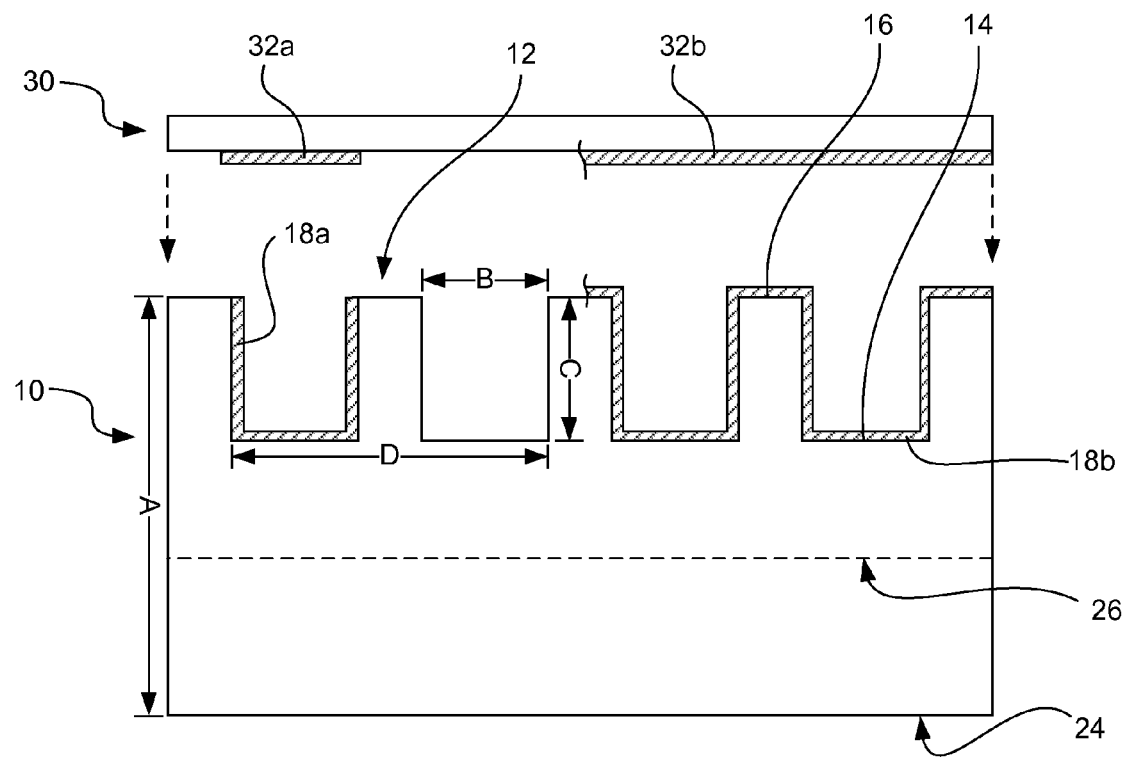
FIG. 2 is an end view of various examples of the waveguide array in accordance with examples of the present disclosure.

Turning now to FIG. 2, an end view of various examples of the waveguide array is shown. Specifically, a base portion 10 and cover portion 30 are shown as they relate to one another for assembly. Particularly, the base portion includes an inner surface 12 and an outer surface 24. The inner surface includes open channels 14 and ridges 16, and the outer surface includes a groove 26 (shown as a phantom line because it is not visible from this view). The groove is included in the base portion for the purpose of providing a breaking point to form a clean end surface (not shown due to the fact that the base portion has not yet been broken to expose the clean end surface). Letters A-D set forth exemplary dimensions of this example, which are not intended to be limiting, but merely illustrate the order of size magnitude these small waveguide array devices represent. Specifically, dimension A can be from about 1-10 mm. Dimension B can be from about 50-250 µm. Dimension C can be about 50-250 µm. Dimension D can be about 100-500 µm.

Also shown in FIG. 2 are various examples of metallization of the waveguide array along the inner surface 12 of the base portion 10 and along the cover portion 30. In this example, the metallization occurs prior to breaking the part to form the clean end faces, but metallization can occur after breaking the base portion as well. Specifically, in this FIG., two different examples are shown. In one example, metallization occurs only in the areas where the open channel 14 is closed by the cover portion 30, as shown by metal coatings 18a and 32a. In another example, the entire inner surface 12 is metalized and an entire surface of the cover portion 30 is metalized prior to assembling the cover portion on the base portion, as shown by metal coatings 18b and 32b. Other combinations are also possible, as long as the closed channel, i.e. the combination of the open channel of the base portion as closed by the cover portion, is metalized to form an appropriate and effective closed channel for propagation of optical energy.

Figure 3:
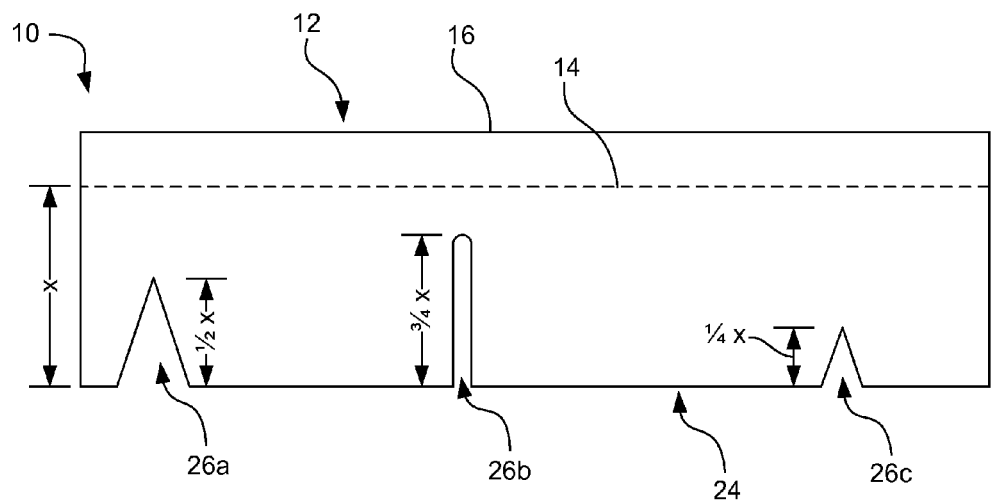
FIG. 3 is a side view of various examples of the base portion of the waveguide array, taken perpendicularly compared to the end view of FIG. 2, in accordance with the present disclosure.

Turning now to FIG. 3, a few examples of various grooves 26a, 26b, 26c are shown having different shapes and different depths. Again, a base portion 10 that includes an inner surface 12 and an outer surface 24 is shown. The inner surface includes open channels 14 and ridges 16, and the outer surface includes various grooves. For reference, dimension x is shown which represents the distance from the outer surface to the bottom of the open channels. As mentioned previously, the groove can be included at from 10% to 90% deep measured from the outer surface to the channels. It is noted that the groove is not merely a score or a line scratched across the surface. It is a penetrating groove that is cut, molded, or otherwise present, and is provided relatively deeply in the body of the base portion, originating from the outer surface. That being said, three different groove depths are shown in this FIG. by way of example. Specifically, groove 26a depicts cut, sawed, melted, molded, embossed, milled, etc., groove having a sharp breaking point for forming a clean end surface (not shown). This groove penetrates the base portion at a distance of about ½x or 50% of the distance between the outer surface and the open channels. Groove 26b shows another type of groove that is cut, sawed, melted, molded, embossed, milled, etc., and which is in the shape of a thin void. This type of groove provides a more minimal disruption along the end surface (once broken). In this specific example, the groove penetrates the base portion at a distance of about ¾x or 75% of the distance between the outer surface and the open channels. Groove 26c shows a groove that is cut, sawed, melted, molded, embossed, milled, etc., and which is similar to that of groove 26a, except that the groove penetrates the base portion a distance of only about ¼× or 25% of the distance between the outer surface and the channels. It is noted that in this particular example, the base portion is not metalized prior to breaking; however, it could be metalized first, and then broken to expose the clean end surface.

Figure 4:
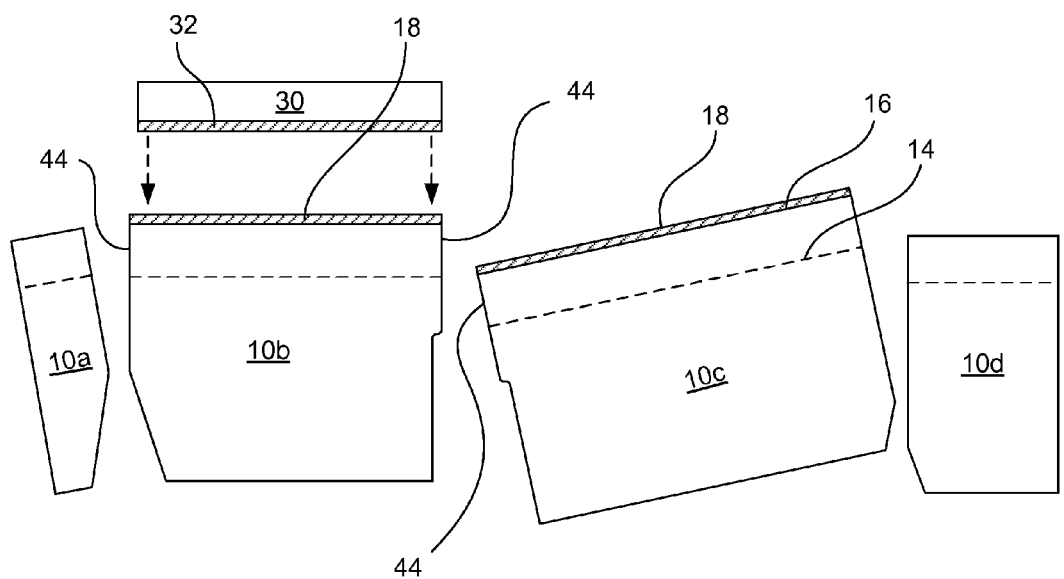
FIG. 4 depicts the example of FIG. 3 after breaking the base portion and metalizing an inner surface of the base portion as well as the cover portion in accordance with the present disclosure.

FIG. 4 shows multiple base portions prepared from the part shown in FIG. 3 at a later stage in the preparative process. Specifically, base portion 10 of FIG. 3 is now broken into base portions 10b and 10c. Parts 10a and 10d in this example are discarded as waste. Once broken to expose multiple clean end faces 44, the base portion 10b and 10c are coated with a metal coating 18 along the open channels 14 and optionally, the ridges 16. Likewise, the cover portion 30 is metalized by metal coating 32, and the cover portion is attached to the inner surface of the base portion to close the channels of the waveguide array.

Waveguide arrays, such as hollow metalized waveguides in particular, typically include a hollow air core surrounded by highly reflective metallic wall. The metallic wall is supported by a substrate of any suitable material, but often includes silicon, plastic sheets, or glass. A variety of patterning processes can be used to form hollow waveguide arrays in accordance with examples of the present disclosure, including wet and dry etching, extruding, molding, embossing, roll-to-roll embossing, and other suitable processes. For example, some forms of plastic molding are used to create trenches or open channels which can be metalized to form the waveguide array. According to a more specific example, the sidewalls and bottom of these trenches or open channels can be metalized using a sputtering process to provide a highly reflective surface at the wavelengths of interest. Silver can be sputter-coated into the trenches to provide the reflective coating. The silver can be overcoated with a passivation layer, such as aluminum nitride, which can protect the coating and prevent oxidization. An undercoat may also be provided to improve the adhesion of the silver layer to the substrate. A waveguide cap or cover portion can also be metalized on the substrate to cover the trenches and complete the waveguide array. Other metals may also be used in place of silver such as but not limited to gold, copper, or aluminum. As mentioned, typical dimensions of a hollow waveguide cross-section may be approximately 50-250 µm, for example. That being stated, the size and geometry of the waveguides can be altered according to the specific design.

Turning to FIG. 5, a top view of the open channels 14 along the inner surface 12 is shown as they relate to the grooves 26 (shown in phantom lines) formed in the outer surface (not shown). Also shown in this example are the ridges 16 of the base portion. The cover portion (not shown) will rest on the ridges, closing the open channels to form the array of waveguides. Also shown in this example is that the orientation of grooves can be perpendicular to the open channels, or angled other than perpendicularly with respect to the open channels.

In FIG. 6, method steps of making a waveguide array can comprise forming a base portion having an inner surface and an outer surface 50. The inner surface can include a plurality of open channels, and the outer surface can include a groove oriented to intersect the open channels, but which is not deep enough to disrupt the open channels. Additional steps include breaking the base portion along the groove to form a clean end surface on the base portion 52, and attaching a cover portion to the inner surface of the base portion to form an array of closed channels 54. Typically, the array of closed channels is metalized prior to assembly of the base portion with the cover portion. Metalization can also be carried out either prior to breaking the part, or after breaking the part.

In accordance with examples of the present disclosure, multiple waveguide arrays and other devices can be optically connected using waveguide arrays of the present disclosure. For example, the waveguide arrays can optically couple backplanes, blades, and other devices in a server, or can be part of these devices. To illustrate one device, one can consider the backplane, which refers to a structure having multiple communication channels which can be accessed through a number of integrated sockets or other receptacles. For example, a backplane may contain a common bus to which a number of separate devices may connect. Backplane communication channels may include electrical wires, optical fibers or other waveguides (including the waveguide arrays of the present disclosure), or other channels. The backplane may contain optical to electrical transducers, signal processing electronics, various types of light sources. Where the term "optical backplane" is used, the backplane includes at least one channel which is configured to convey optical signals through the backplane.

While the forgoing examples are illustrative of the principles of the present technology in particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A waveguide array, comprising:
a base portion having a metalized inner surface, an outer surface, and a clean end surface, the inner surface including a plurality of waveguide channels that are metalized, the clean end surface prepared by breaking the base portion along a groove positioned on the outer surface prior to breaking, the groove being oriented to intersect the waveguide channels; and
a metalized cover portion attached to the inner surface of the base portion to close the waveguide channels.

2. The waveguide array of claim 1, having two clean end surfaces at opposing ends of the waveguide array.

3. The waveguide array of claim 1, wherein the metalized cover portion comprises a plastic substrate with a metalized surface, and the metalized surface is attached to the metalized inner surface of the base portion to close the waveguide channels.

4. The waveguide array of claim 1, wherein the clean end surface is perpendicular to the waveguide channels.

5. The waveguide array of claim 1, wherein the clean end surface is not perpendicular to the waveguide channels.

6. The waveguide array of claim 1, wherein the waveguide channels have a cross-sectional dimension of about 50-250 µm.

7. A method of making a waveguide array, comprising:
forming a base portion having an inner surface and an outer surface, the inner surface including a plurality of open channels as waveguide channels, the outer surface including a groove oriented to intersect the open channels, but which is not deep enough to disrupt the open channels;
breaking the base portion along the groove to form a clean end surface on the base portion; and attaching a cover portion to the inner surface of the base portion to form an array of closed channels, wherein the array of closed channels are metalized.

8. The method of claim 7, wherein the array of closed channels are metalized by applying a metal coating to the inner surface prior to breaking, and applying a metal coating to the cover portion prior to attaching the cover portion to the inner surface.

9. The method of claim 7, wherein the array of closed channels are metalized by applying a metal coating to the inner surface after breaking, and applying a metal coating to the cover portion prior to attaching the cover portion to the inner surface.

10. The method of claim 7, wherein the step of forming the base portion is by molding, injection molding, extruding, embossing, roll-to-roll embossing, wet etching, or dry etching.

11. The method of claim 7, wherein the groove is formed using a saw, hotwire, blade, end mill, or diamond tip.

12. The method of claim 7, wherein the groove is formed as part of a molding, embossing, or etching process.

13. The method of claim 7, wherein the groove is from 10% to 90% deep measured from the outer surface to the open channels.

14. The method of claim 7, wherein the groove is perpendicular to the channels.

15. The method of claim 7, wherein there are multiple grooves on one base portion, and the multiple grooves undergo breaking to form multiple clean end surfaces.

* * * * *